United States Patent [19]

Hanaoka

[11] 4,363,058
[45] Dec. 7, 1982

[54] MAGNETIC RECORDING DEVICE

[75] Inventor: Naohiro Hanaoka, Hachioji, Japan

[73] Assignee: Olympus Optical Co., Ltd., Tokyo, Japan

[21] Appl. No.: 145,734

[22] Filed: May 1, 1980

[30] Foreign Application Priority Data

May 15, 1979 [JP] Japan .................. 54-59484

[51] Int. Cl.³ .......................... G11B 5/22; G11B 5/20
[52] U.S. Cl. .................................. 360/122; 360/120; 360/125
[58] Field of Search ................ 360/122, 123, 119–121, 360/125, 126, 127, 55; 358/114

[56] References Cited

U.S. PATENT DOCUMENTS

| | | | |
|---|---|---|---|
| 2,514,577 | 7/1950 | Heller | 360/122 |
| 3,140,361 | 7/1964 | Eldridge | 360/119 X |
| 3,303,292 | 2/1967 | Bedell, Jr. et al. | 360/119 X |
| 4,017,899 | 4/1977 | Bagby | 360/122 |
| 4,118,736 | 10/1978 | Okada et al. | 358/128.5 |
| 4,253,019 | 2/1981 | Opheij et al. | 358/128.5 X |

FOREIGN PATENT DOCUMENTS 51-80134 7/1976 Japan .
54-149611 11/1979 Japan .................. 360/121
472757 5/1969 Switzerland .

OTHER PUBLICATIONS

IBM/TDB, vol. 4, No. 1, Jun. 1961, p. 17, "Manufacture of Electromagnetic Transducer" by Moore.

*Primary Examiner*—John H. Wolff
*Attorney, Agent, or Firm*—Frishauf, Holtz, Goodman and Woodward

[57] ABSTRACT

A magnetic recording device comprises a winding and magnetic head guiding magnetic flux produced by the winding to a recording medium and magnetically recording information on said medium. The magnetic head includes a chip formed on nonmagnetic material having a narrow distal end face and a ferromagnetic thin membrane held by said chip, having one end exposed from the distal end face of said chip and the other extending on the winding side, and passing magnetic flux from said winding to said one end, whereby information is recorded on said recording medium through said one end.

9 Claims, 6 Drawing Figures

MAGNETIC RECORDING DEVICE

BACKGROUND OF THE INVENTION

This invention relates to a magnetic recording device for recording information such as sounds and pictures on a recording medium formed of amorphous alloy such as rare-earth element-iron alloy which has magnetic anisotropy in a direction perpendicular to the surface thereof.

Conventionally, ring-shaped magnetic heads are used with e.g. magnetic discs in recording and reproducing information on a recording medium. In the use of such magnetic heads, track width cannot be narrowed without decreasing an S/N ratio at playback. Typical heads exhibit the narrowest allowable track width of scores of micrometers and thereabouts, so that they are unsuitable for high-density recording.

In order to increase the recording density, therefore, there has been developed a photo-magnetic recording system using light beams such as laser beams. Although capable of reducing the track width to approximately 1 $\mu$m, this system is subject to the following defects. According to this photo-magnetic recording system, a light beam such as a laser beam, as well as a magnetic field perpendicular to the surface of a recording medium, is applied to the recording medium which is formed of amorphous alloy such as rare-earth element-iron alloy having magnetic anisotropy in a direction perpendicular to the surface thereof and temperature-dependent coercive force, and information is recorded on the recording medium by causing magnetic inversion in accordance with signals by means of the heat energy of the light beam. This system, however, requires a high-energy laser light source, so that the optical system including such light source will be large-sized, and the heat energy of light beams will possibly cause deformation of the recording medium. Moreover, when a light beam is applied to the recording medium for magnetic inversion, the temperature is gradually reduced from the center of the beam toward the periphery thereof to enlarge the magnetized region, so that the resolution of reproduced information may be deteriorated or the temperature distribution may vary with respect to the longitudinal and transverse directions of the track depending on the recording position on the medium, causing production of noise in the case of FM recording, for example. In order to obviate the latter defect, there is proposed a method for preventing enlargement of the magnetized region in the opposite direction to the direction of magnetic inversion (Japanese Patent Disclosure No. 80134/76). However, this method still involves a practical problem, that is, a technical difficulty in controlling the light beam and magnetic field applied to the recording medium within a delicate range of magnetic inversion.

SUMMARY OF THE INVENTION

The object of this invention is to provide a magnetic recording device capable of high-density recording without applying heat energy such as laser beams to a recording medium.

BRIEF DESCRIPTION OF THE DRAWINGS

FIGS. 1 to 5 show an embodiment of the magnetic recording device of this invention, in which:

FIG. 1 is a schematic plan view;

FIG. 2 is a schematic view for illustrating the construction of the part of the device;

FIG. 3 is a perspective view of the chip side of a magnetic head;

FIG. 4 is a front view of the magnetic head; and

FIG. 5 is a sectional view of the magnetic head as taken along line V—V of FIG. 4.

DETAILED DESCRIPTION OF THE PREFERRED EMBODIMENT

Referring now to FIGS. 1 to 5, there will be described an embodiment of this invention.

Figure 1:
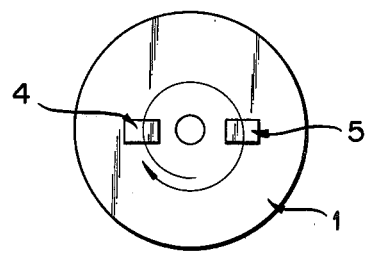
Figure 2:
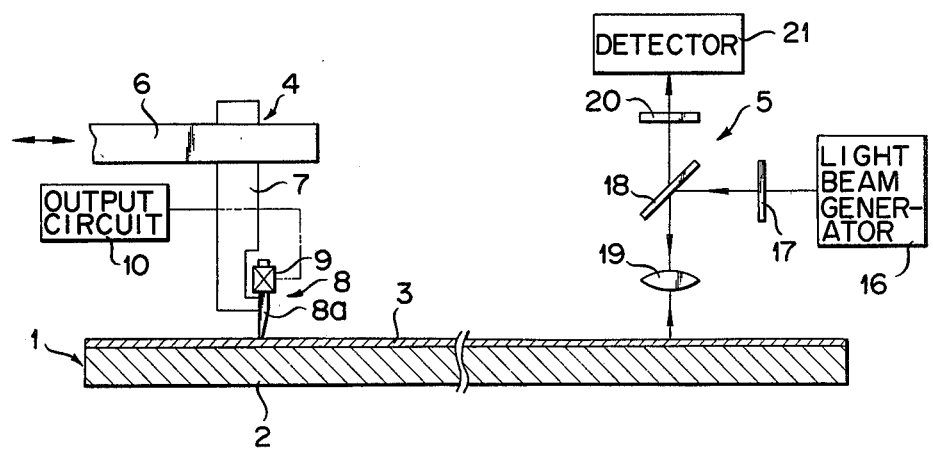

In FIGS. 1 and 2, numeral 1 designates a recording-/reproducing disc which comprises a base 2 formed of synthetic resin and a recording medium 3 formed on the surface of the base 2. The recording medium 3 is a thin film of amorphous alloy, such as Tb-Fe alloy or some other rare-earth element-iron alloy, which is formed on the base 2 by evaporation, plating or sputtering, exhibiting magnetic anisotropy in a direction perpendicular to the film surface and a temperature-dependent coercive force. The recording/reproducing disc 1 is rotated at a constant speed in the direction of an arrow of FIG. 1 by a conventional driving system (not shown). A magnetic recording mechanism 4 and a photo-magnetic reproducing mechanism 5 are disposed opposite to the disc 1. When these mechanisms 4 and 5 are operated for tracking, information is recorded on the recording medium 3 by the magnetic recording mechanism 4, and the recorded information is read and reproduced by the photo-magnetic reproducing mechanism 5. In this case, the tracking form may be spiral, as represented by the arrow of FIG. 1, or concentric.

Figure 3:
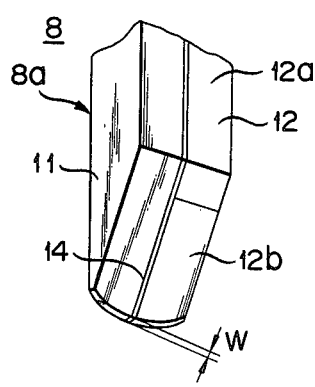
Figure 4:
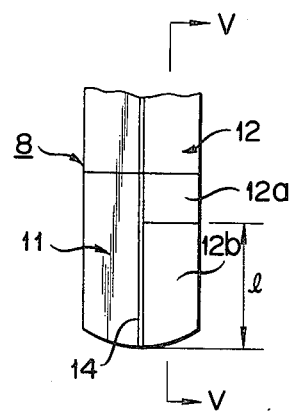
Figure 5:
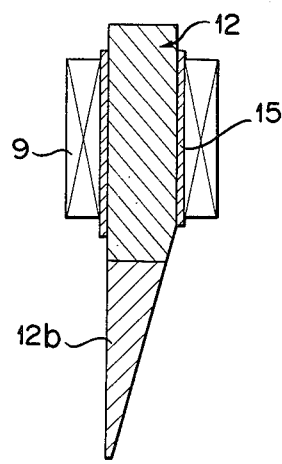

Now the magnetic recording mechanism 4 will be described in detail. The magnetic recording mechanism 4 includes a support arm 6 so disposed as to be able to move in the radial direction of the recording/reproducing disc 1 and driven by a driving mechanism (not shown), a support member 7 attached to the support arm 6, a single-pole magnetic head 8 supported on the bottom end portion of the support member 7, and a winding 9 wound around the head 8 and supplied with signals from a signal output circuit 10. The magnetic head 8 includes a vertically extending rectangular chip 8a with a transversely extending taper formed on one side of the lower portion, having given tip width W, and the winding 9 wound around the chip 8a. As shown in FIG. 3, the narrow tip of the chip 8a is arcuate across the thickness of the chip 8a. The chip 8a is comprised of a pair of vertically extending thin chip pieces 11 and 12, and a thin membrane 14 held between these chip pieces. One chip piece 11 is wholly formed of nonmagnetic material such as ceramic, while the other chip piece 12 is comprised of an upper portion 12a formed of ferromagnetic material such as ferrite and a lower portion 12b formed of ceramic or other nonmagnetic material. The lower portion of the chip in the vicinity of lower portion 12 is designated as the distal end portion. The thin membrane 14 is formed of material with high allowable magnetic flux density, such as permalloy, Sendust, amorphous magnetic material, etc., or ferromagnetic material, and has a thickness set to approximately 1 $\mu$m in order to increase the density of magnetic flux passing through the thin membrane 14. The nonmagnetic chip piece 11 functions to support and protect the thin membrane 14 in cooperation with the other chip piece 12. The ferromagnetic upper portion 12a of the chip piece 12 touches the thin membrane 14 to lead magnetic flux produced by the winding 9 to the thin membrane 14 with good efficiency, that is, with reduced magnetic resistance. The nonmagnetic lower portion 12b has a function to define the effective length l (see FIG. 4) of the thin membrane 14. The effective length designates a distance between the bottom end of the ferromagnetic upper portion 12a and the bottom end of the thin membrane 14, defining a region of the thin membrane 14 where the density of the magnetic flux is increased. If the effective length l is too long, the magnetic resistance will become greater to increase magnetic loss. If l is too short, on the other hand, the magnetic flux will not possibly be able to converge fully. Thus, the effective length l may be preferably set to tens to hundreds of micrometers.

The taper at the bottom of the chip may be preferably so formed by grinding as to have a width of several micrometers or less.

In the magnetic head of the aforementioned structure, the channel of the recording medium 3 shown in FIG. 2 is scanned with the bottom edge of the thin membrane 14 which is located at right angles to the channel and exposed at the tip end portion of the magnetic head.

In the photo-magnetic reproducing mechanism 5, a light beam generator or source 16 produces a light beam such as a laser beam providing a required S/N ratio for reproduction, and the light beam emitted from the generator 16 is projected on a half mirror 18 through a polarizing plate 17. The half mirror 18 is disposed over the recording/reproducing disc 1 with a condensing lens 19 interposed therebetween. On the opposite side of the half mirror 18 to the disc 1, there are a polarizing plate 20 on which light reflected by the disc 1 and transmitted through the half mirror 18 is projected and a detector 21 which comprises a photoelectric converting element, etc.

According to such magnetic recording device, information is recorded on the recording medium 3 not by radiation of light beams but by using the magnetic head 8. Therefore, the drawbacks of the photo-magnetic recording system, i.e. the increase of the recording device in size due to the bulkiness of the optical system required and the fear of thermal deformation of the recording medium, can be eliminated. Moreover, causes of deterioration in resolution and production of noise due to enlargement or variations of magnetized regions may be obviated to facilitate control of the recording device.

Further, since the magnetic head 8, unlike the conventional ring-shaped one, has the aforementioned construction, if signal current is casued to flow from the signal output circuit 10 to the winding 9, the magnetic flux will converge only onto a portion of the ferromagnetic thin membrane 14 corresponding to the length l. Furthermore, the magnetic head 8, being of single-pole structure, has an extremely narrow track width W, (FIG. 3) so that an intensive magnetic field is perpendicularly applied to the recording medium 3 within a limited area. Thus, a very narrow region of the recording medium 3 can accurately be magnetized for high-density recording of information.

The recorded information is read out and reproduced when the recording/reproducing disc is rotated to face the photo-magnetic reproducing mechanism 5. That is, a light beam emitted from the light beam generator 16 is reflected by the half mirror 18 by way of the polarizing plate 17, then converged by means of the condensing lens 19, and applied to the recording medium 3 so as to form a spot thereon. In this case, the light beam has an intensity just great enough to obtain the desired S/N ratio and not so great as to cause magnetic inversion in the recording medium 3, so that it will never cause thermal deformation of the recording medium 3 or increase in size of the photo-magnetic reproducing mechanism 5. The reflected light from the recording medium 3 is transmitted again through the condensing lens 19 and the half mirror 18 in succession, and then applied through the polarizing plate 20 to the detector 21, where the recorded information is detected and read out. In such reproduction, the information is read out taking advantage of a fact that light transmitted through or reflected by magnetized and nonmagnetized portions may vary in the angle of rotation, subjected to the actions of different deflection planes due to the magnetooptic Faraday effect or Kerr effect.

As may be seen from the above description, the device of this invention can perform high-density playback operations.

Figure 6:
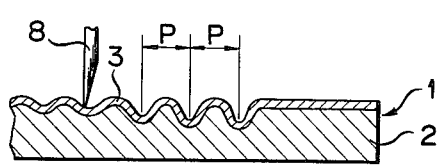
FIG. 6 is a partial sectional view showing a modification of a recording/reproducing disc.

FIG. 6 shows a modification of the recording/reproducing disc 1 which has a spiral groove or concentric grooves in the surface. The groove or grooves are precisely formed with a predetermined pitch P, facilitating the tracking operation of the magnetic head 8 at recording on the recording medium 3. In this case, the magnetic head 8 is supported on a flexible support member which enables the magnetic head 8 to follow the groove with ease so that the magnetic head 8 may scan the track along the groove spiral.

This invention is not limited to the above-mentioned embodiments. For example, the invention may be applied to devices using recording/reproducing tapes, as well as to those which utilize recording/reproducing discs. Moreover, the tip end of the chip of the magnetic head need not always touch the disc or the like, and there may be effected a non-contact type in which the tip end is lifted off the disc, etc. slightly (leaving a space of 1 $\mu$m or less). In this case, therefore, the tip end of the chip may be arcuate or straight. In short, the chip-side portion of the magnetic head need only by tapered, and may have a slope on each side. It is to be understood that the structure and shape of the magnetic head and the optical system and other systems of the photo-magnetic reproducing mechanism may be changed or modified variously without departing from the scope or spirit of the invention.

As stated above, the device of this invention records information on a recording medium by means of a magnetic recording mechanism which is provided with a single-pole magnetic head having a ferromagnetic thin membrane to converge magnetic flux at right angles to the surface thereof and a narrow track width, thereby ensuring high-density recording. Moreover, since the device of the invention does not use the photo-magnetic recording system, there will be no fear of increase in size of the recording device due to the use of a large optical system peculiar to such recording system or of thermal deformation of the recording medium. Freed from deterioration in resolution and production of noise, furthermore, the magnetic recording device of this invention may enjoy ease of manufacture and high feasibility.

What is claimed is:

1. In a megnetic recording device for recording information on a track of a recording medium having magnetic anisotropy across the thickness thereof, comprising a flux producing winding adapted to be coupled to a signal source, and a magnetic head which includes said winding and means for guiding magnetic flux produced by said winding to said recording medium and magnetically recording information corresponding to said magnetic flux on said medium, the improvement wherein:

said magnetic flux guiding means of said magnetic head includes:

a chip having a distal end portion and an opposite proximal end portion for receiving said winding thereon, said distal end portion being formed of nonmagnetic material and said proximal end portion including a ferromagnetic portion located at said winding receiving portion of said chip; and a single ferromagnetic thin membrane held by said chip, said single thin membrane having one end thereof located at said distal end portion of said chip and the other end thereof extending to the winding receiving portion of said chip, said single thin membrane passing magnetic flux produced from said winding to said one end thereof and being so disposed that its thickness direction extends in the same direction as the track of the recording medium, whereby information is recorded on said recording medium through said one end of said single thin membrane located at said distal end of said chip;

said chip including a pair of chip pieces with said ferromagnetic thin membrane held therebetween, one of said chip pieces being formed completely of nonmagnetic material, and the other of said chip pieces comprising a nonmagnetic distal end portion located at the distal end of said chip and said ferromagnetic proximal end portion located at said winding receiving portion of said chip, the magnetic flux produced from said winding being guided to said single ferromagnetic thin membrane through said proximal end portion; and a read out means is provided which includes a photomagnetic reproducing mechanism for directing a light beam to said recording medium and for detecting a change of the rotation angle of the plane of polarization of the light reflected from said recording medium.

2. A magnetic recording device according to claim 1, wherein the distal end portion of said chip has a narrow tip end face having an opening therein through which said one end of said ferromagnetic thin membrane is exposed.

3. A magnetic recording device according to claim 2, wherein the distal end portion of said chip has a tapered face extending in one direction, said tapered face being substantially parallel to the thickness direction of said single thin membrane to define a very thin distal end of said magnetic head.

4. A magnetic recording device according to claim 1, wherein said ferromagnetic thin membrane is a film with a thickness of approximately 1 micrometer.

5. a magnetic recording device according to claim 4, wherein the nonmagnetic distal end portion of said other chip piece has a length of from tens to hundreds of micrometers.

6. A magnetic recording device according to claim 1 wherein said ferromagnetic thin membrane extends substantially at a right angle to said recording medium.

7. A magnetic recording device according to claim 1 or 6, wherein said ferromagnetic thin membrane is substantially planar.

8. A magnetic recording device according to claim 7, wherein said thin membrane has opposing planar surfaces, both of said planar surfaces contacting said chip over the complete surface areas thereof.

9. A magnetic recording device according to claim 1, wherein said single ferromagnetic thin membrane is substantially planar and has opposing planar surfaces, both planar opposing surfaces contacting said chip over the complete surface area thereof.

* * * * *

UNITED STATES PATENT AND TRADEMARK OFFICE
CERTIFICATE OF CORRECTION

PATENT NO. : 4,363,058
DATED : December 7, 1982
INVENTOR(S) : Naohiro HANAOKA

It is certified that error appears in the above-identified patent and that said Letters Patent is hereby corrected as shown below:

COLUMN 3, line 8, change "length designates" to

--length $\ell$ designates--;

COLUMN 4, line 34, change "groove spiral" to

--the spiral groove--.

Signed and Sealed this

Fifth Day of April 1983

[SEAL]

Attest:

Attesting Officer

GERALD J. MOSSINGHOFF

Commissioner of Patents and Trademarks